US009056569B2

(12) United States Patent
Lindloff

(10) Patent No.: US 9,056,569 B2
(45) Date of Patent: Jun. 16, 2015

(54) MOTORCYCLE PASSENGER ARMREST ASSEMBLY

(75) Inventor: Christopher D. Lindloff, New Richmond, WI (US)

(73) Assignee: Kuryakyn Holdings, LLC, Somerset, WI (US)

( * ) Notice: Subject to any disclaimer, the term of this patent is extended or adjusted under 35 U.S.C. 154(b) by 478 days.

(21) Appl. No.: 13/372,591

(22) Filed: Feb. 14, 2012

(65) Prior Publication Data
US 2012/0205957 A1   Aug. 16, 2012

Related U.S. Application Data

(60) Provisional application No. 61/463,397, filed on Feb. 16, 2011.

(51) Int. Cl.
B60N 2/46 (2006.01)
B62J 1/28 (2006.01)

(52) U.S. Cl.
CPC ............ B60N 2/4673 (2013.01); B60N 2/4626 (2013.01); B60N 2/4646 (2013.01); B60N 2/4653 (2013.01); B62J 1/28 (2013.01)

(58) Field of Classification Search
USPC .................. 297/411.2, 411.21, 411.26, 411.3, 297/411.32, 115, 116, 117, 188.15
See application file for complete search history.

(56) References Cited

U.S. PATENT DOCUMENTS

| 4,225,183 | A | * | 9/1980 | Hanagan et al. | 297/411.31 |
|---|---|---|---|---|---|
| 4,695,096 | A | * | 9/1987 | Kincaid | 297/411.31 |
| 5,615,926 | A | * | 4/1997 | Kanai et al. | 297/411.27 |
| 6,976,552 | B1 | * | 12/2005 | Kicker | 180/219 |
| D526,952 | S | * | 8/2006 | Stahel et al. | D12/411 |
| 7,114,774 | B2 | * | 10/2006 | Stahel et al. | 297/188.15 |
| D555,047 | S | * | 11/2007 | Colbert et al. | D12/119 |
| 7,357,456 | B1 | * | 4/2008 | Freer et al. | 297/411.38 |
| D627,267 | S | * | 11/2010 | Freer et al. | D12/119 |
| D652,356 | S | * | 1/2012 | Lindloff | D12/119 |

* cited by examiner

Primary Examiner — David R Dunn
Assistant Examiner — Timothy J Brindley
(74) Attorney, Agent, or Firm — Dicke, Billig & Czaja, PLLC

(57) ABSTRACT

A passenger armrest assembly includes an armrest coupled to a support tube that is pivotally mounted to an armrest support bracket. The armrest support bracket is configured to be reversibly mounted to a mounting bracket that is installed on a motorcycle structure adjacent to a passenger seat. The armrest support bracket is easily removable when a motorcycle is not carrying a passenger, and is easily attachable to the mounting bracket when a passenger is to be carried on the motorcycle.

3 Claims, 6 Drawing Sheets

MOTORCYCLE PASSENGER ARMREST ASSEMBLY

CROSS-REFERENCE TO RELATED APPLICATIONS

This application claims the benefit of U.S. Provisional Patent Application Ser. No. 61/463,397, filed Feb. 16, 2011.

BACKGROUND

The present invention relates to motorcycle passenger armrest assemblies, and in particular, passenger armrest assemblies that are easily removable when not in use.

BRIEF DESCRIPTION OF THE DRAWINGS

FIG. 1A is an enlarged diagrammatic view of a notched end of an armrest bracket relative to a tab of a mounting bracket of the armrest assembly of FIG. 1.

DETAILED DESCRIPTION OF THE DRAWINGS

Figure 1:
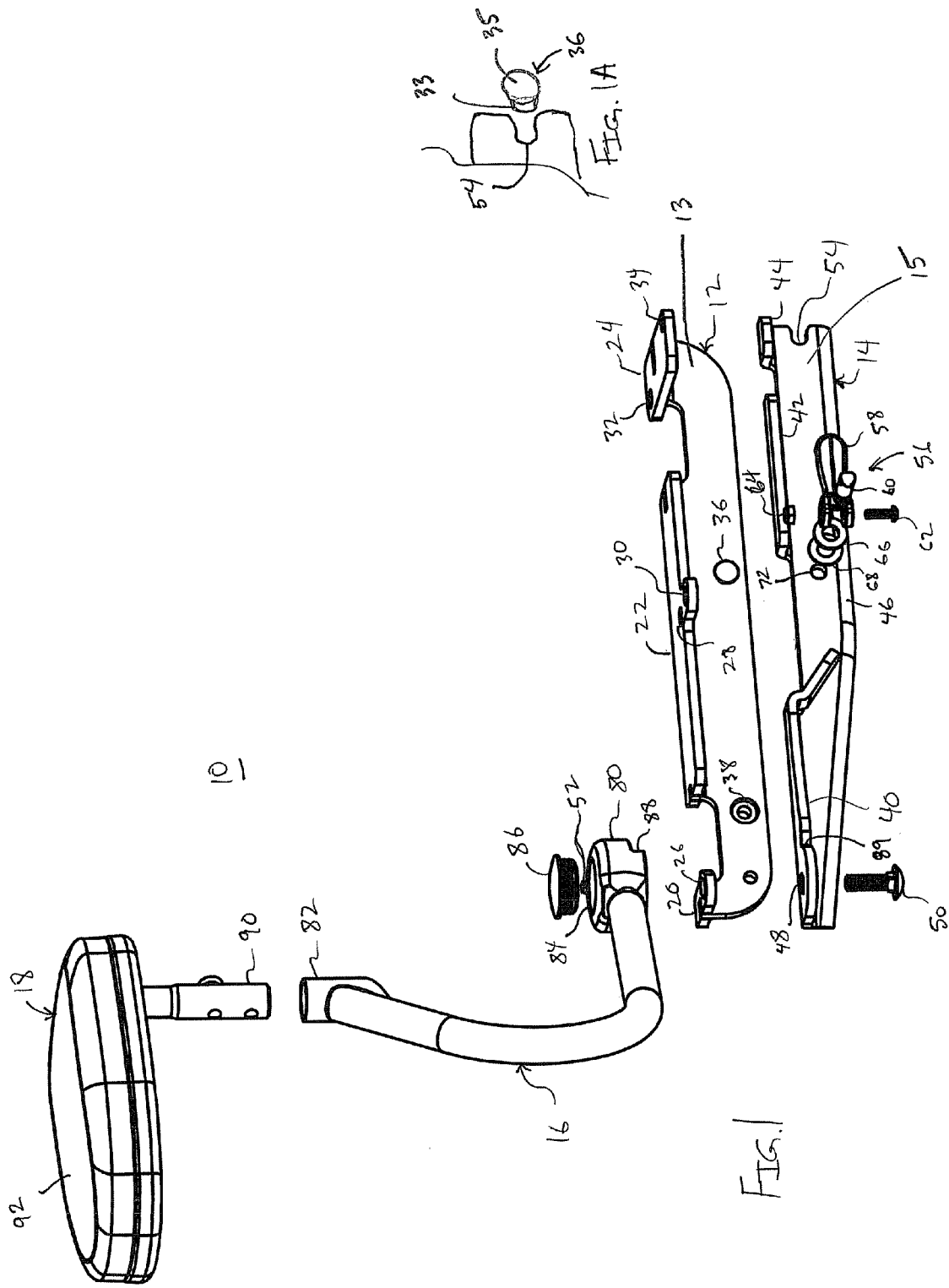
FIG. 1 is an exploded perspective view of a quick-detach passenger armrest assembly of the present invention.
Figure 2:
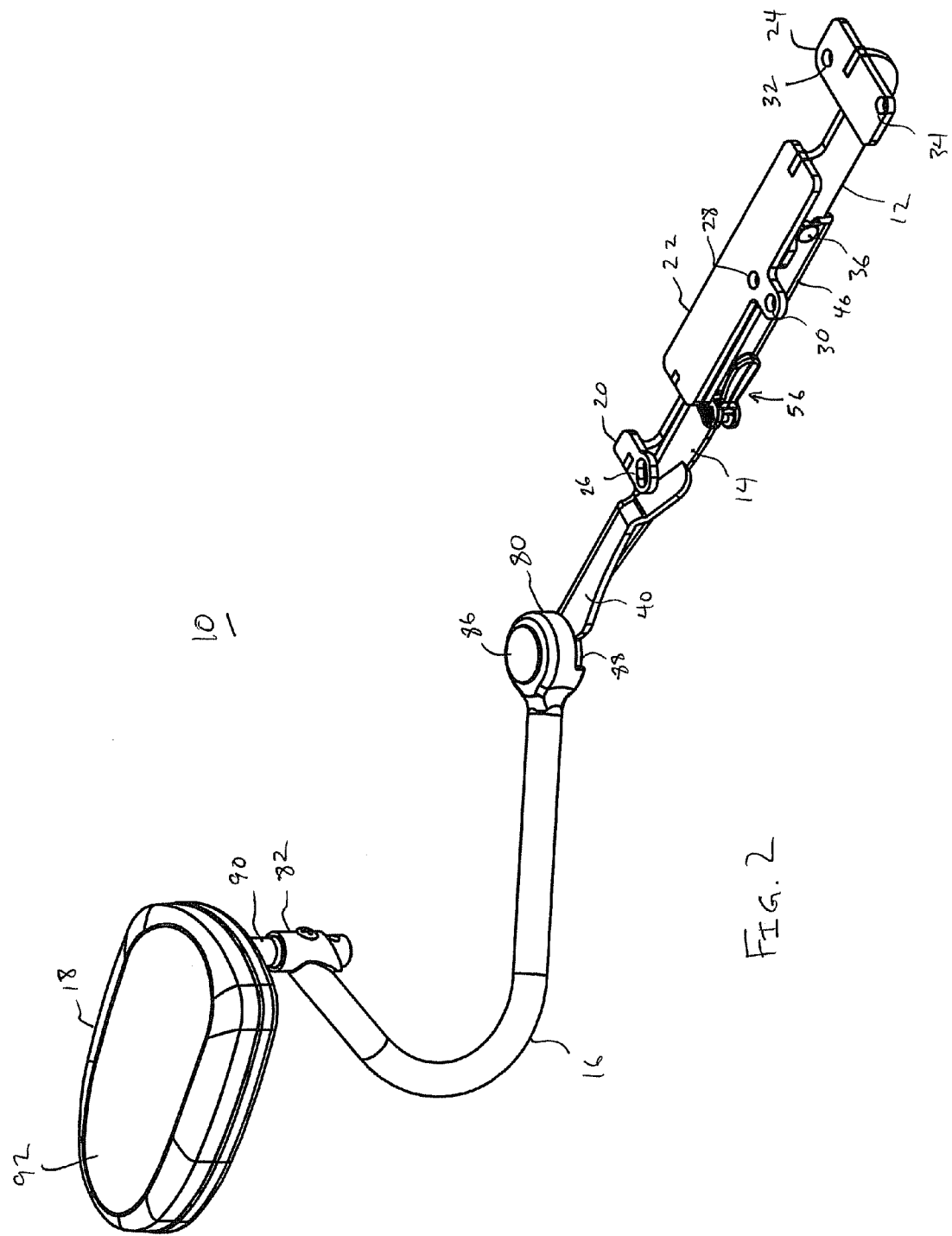
FIG. 2 is a perspective view of an assembled passenger armrest assembly of FIG. 1.
Figure 3:
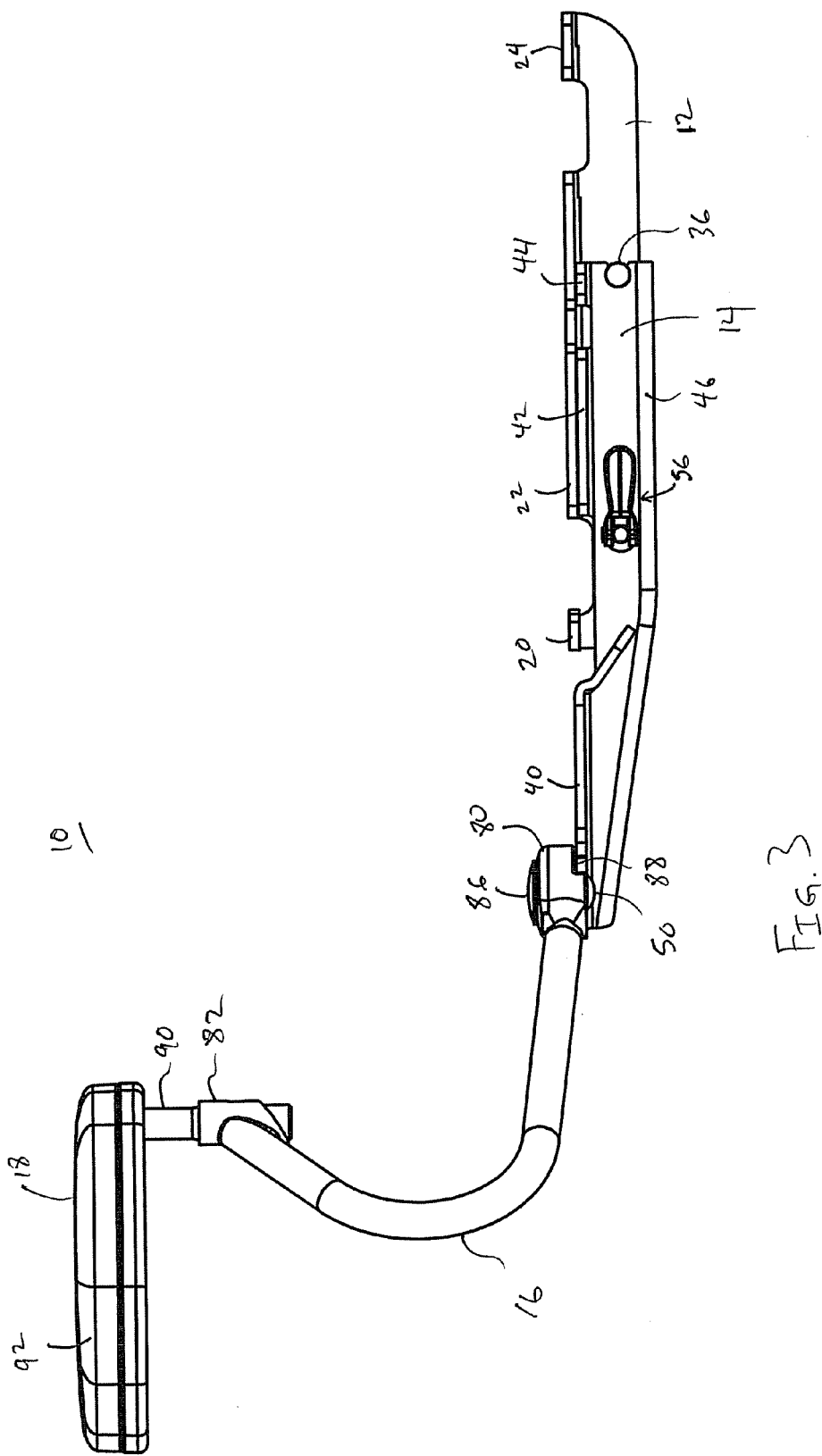
FIG. 3 is a first side view of the passenger armrest assembly of FIG. 2.
Figure 4:
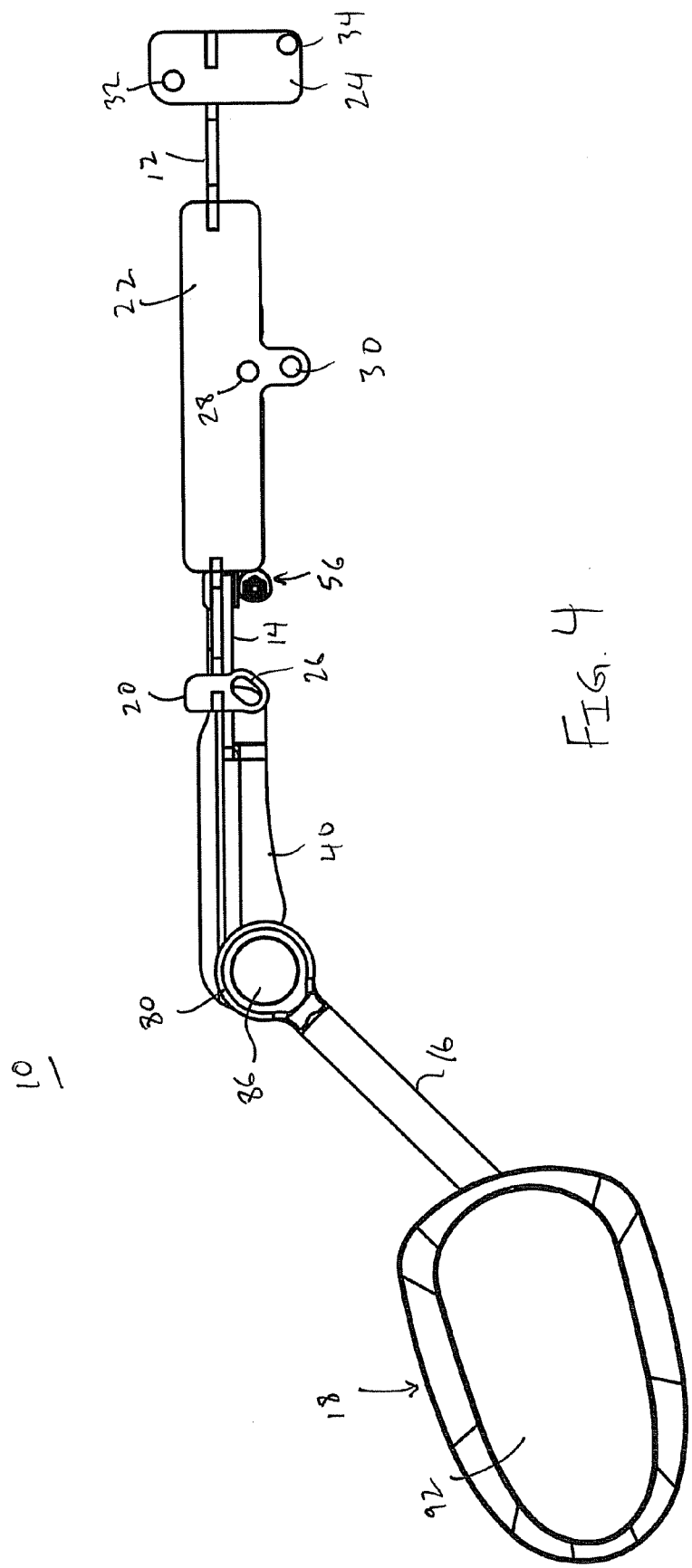
FIG. 4 is a top view of the passenger armrest assembly of FIG. 2.
Figure 5:
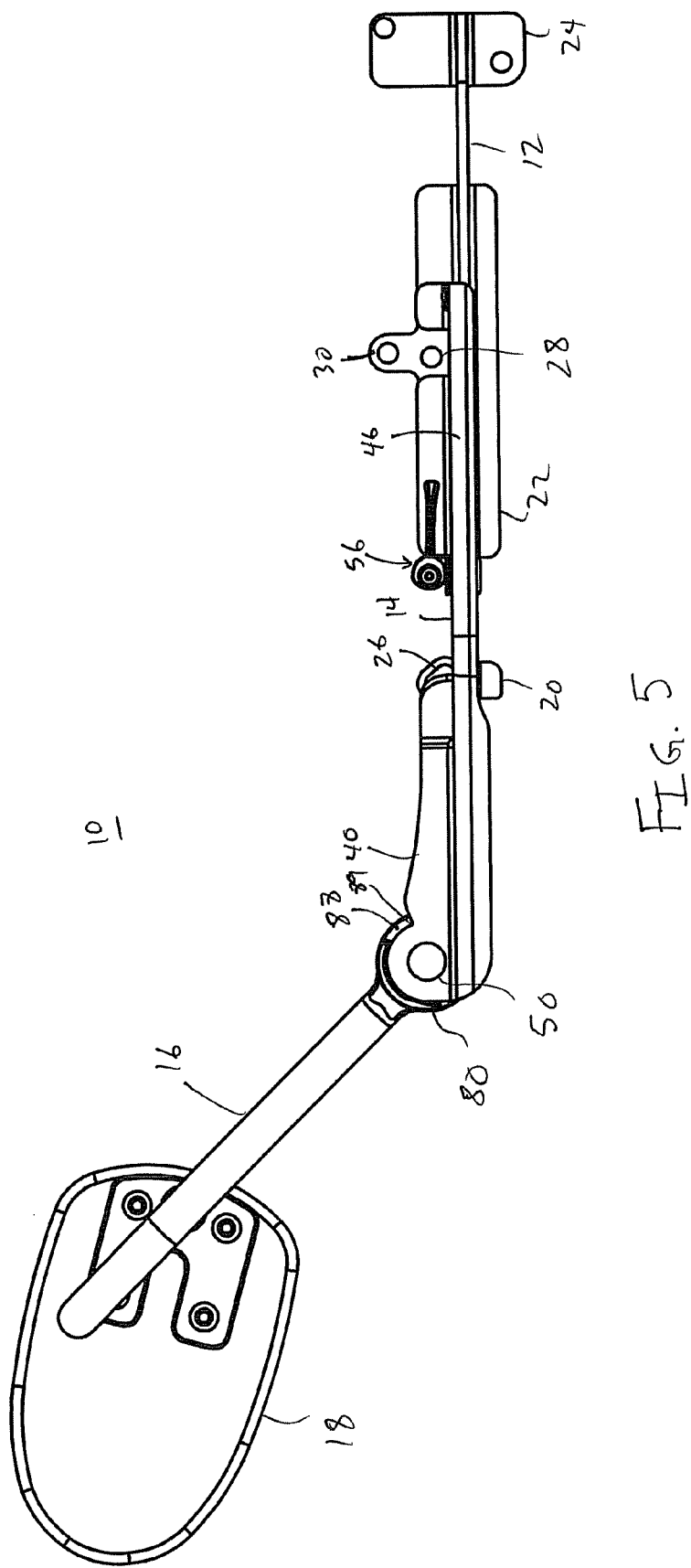
FIG. 5 is a bottom view of the passenger armrest assembly of FIG. 2.
Figure 6:
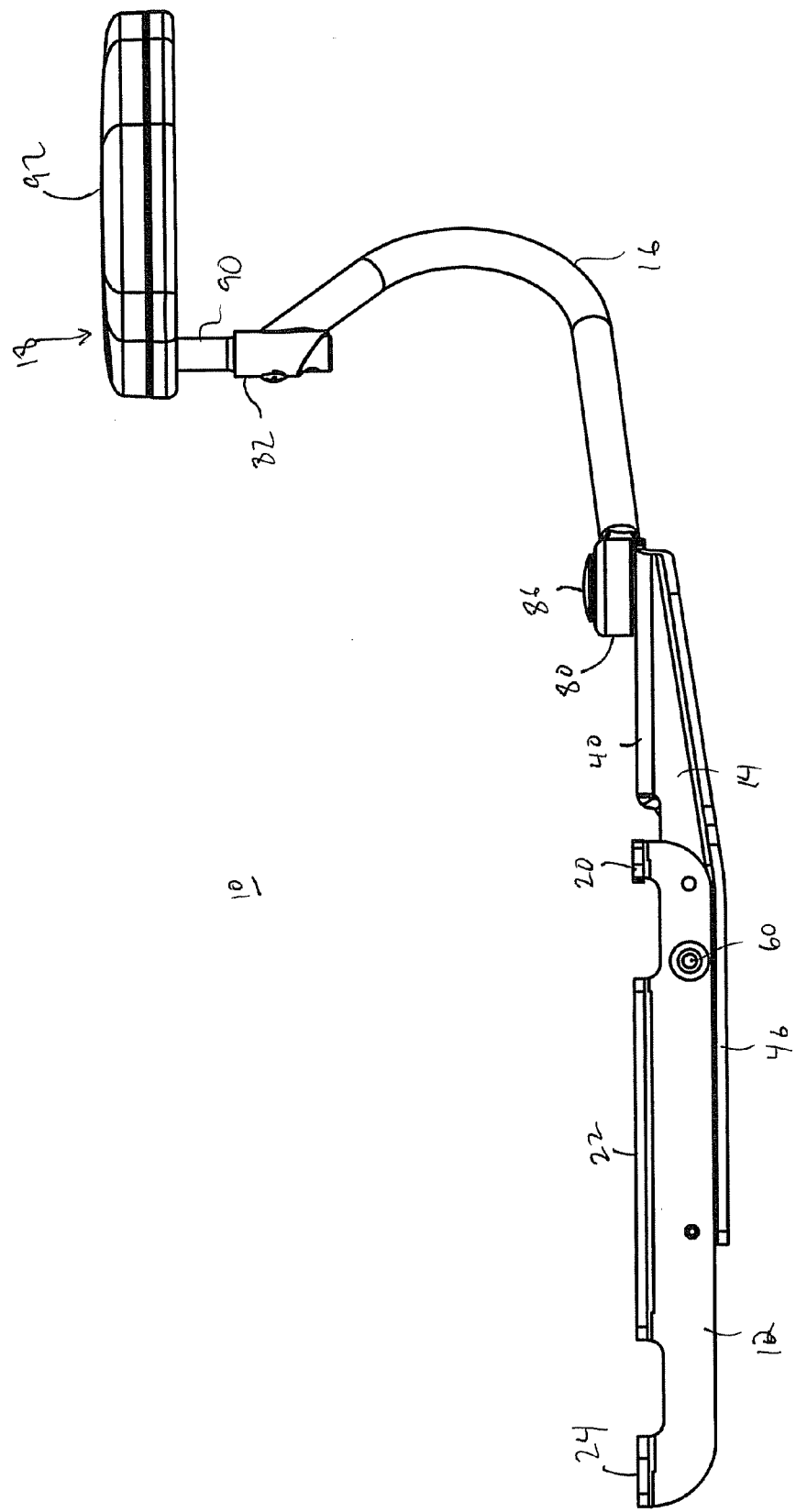
FIG. 6 is a second side view, opposite the first side view, of the passenger armrest assembly of FIG. 2.

FIGS. 1-6 illustrate a quick-detach passenger armrest assembly 10. Assembly 10 includes a mounting bracket 12, an armrest bracket 14, an armrest support tube 16 and an armrest 18. Mounting bracket 12 is configured to be mounted to a frame of a motorcycle in a more permanent fashion such that armrest bracket 14 can be quickly and easily secured thereto and removed therefrom. As such, a user of the motorcycle can quickly and easily attach and detach armrest 18 from the motorcycle as desired. In particular, armrest support tube 16 and armrest 18 are rotatably coupled to armrest bracket 14. In turn, armrest bracket 14 is configured to be secured to mounting bracket 12 such that armrest 18 can provide comfort to a passenger.

Mounting bracket 12 includes a front mounting flange 20, a middle mounting flange 22 and a rear mounting flange 24, each of which are integral with and generally transverse to an elongate mounting plate 13. Flanges 20, 22, and 24 are provided to mount the mounting bracket 12 to an underside of a structure such as a support bracket or combination backrest and cargo carrier assembly. To that end, in one embodiment, mounting bracket 12 is approximately 12 to 18 inches in length, although mounting bracket 12 can be of other lengths. Regardless of the particular length, as illustrated herein, mounting flange 20 includes an aperture 26 configured to receive suitable mounting hardware (e.g., a fastener). Similarly, mounting flange 22 includes a first aperture 28 and a second aperture 30. Additionally, mounting flange 24 includes a first aperture 32 and a second aperture 34. Apertures 28, 30, 32 and 34 are also configured to receive suitable mounting hardware such as a fastener for mounting to an underside of a surface. The mounting plate 13 of mounting bracket 12 further includes a tab 36 and a threaded bore 38 spaced from tab 36 for coupling armrest bracket 14 to mounting bracket 12. In the embodiment illustrated, tab 36 is generally located centrally along a length of the mounting plate 13, whereas bore 38 is generally located toward a front of the mounting plate 13, closer to flange 20.

Armrest bracket 14 includes a front, upper flange 40, an upper middle flange 42, an upper rear flange 44 and a lower flange 46, each of which are integral with and generally transverse to an elongate metal plate 15. In one particular embodiment, armrest bracket 14 is approximately 12 to 18 inches in length, although armrest bracket 14 can be of other lengths. Upper flange 40 is provided to mount armrest support tube 16 to the armrest bracket 14. In particular, flange 40 includes an aperture 48 configured to receive a bolt 50 for coupling with a corresponding nut 52 in order to mount the armrest support tube 16 to mounting flange 40. Upper flanges 42 and 44 are configured to locate the armrest bracket 14 with respect to the mounting bracket 12 and in particular with respect to flange 22. Flanges 42 and 44 are spaced apart so as to accommodate mounting hardware positions within the apertures 28 and 30 of upper flange 22. Lower flange 46 is further provided to locate the armrest bracket 14 with respect to a lower surface of mounting bracket 12.

In order to securely connect armrest bracket 14 to mounting bracket 12, plate 15 of armrest bracket 14 includes a notch 54 in a rear edge of plate 15 and a cam assembly 56 spaced from notch 54. Notch 54 is configured to cooperate with tab 36 located on mounting bracket 12. In addition, cam assembly 56 is configured to cooperate with threaded bore 38 of mounting bracket 12. During assembly, the user will slide armrest bracket 14 in a manner such that notch 54 cooperates with tab 36. For example, as shown in FIG. 1A, tab 36 comprises a post 33 extending normal to plate 13 and a head 35 connected at the free end of post 33. Notch 54 is sized to fit over post 33 and is secured relative to plate 13 by the head 35. After locating notch 54 within tab 36, cam assembly 56 is operated to lock armrest bracket 14 with respect to mounting bracket 12. In particular, cam assembly 56 includes a cam lever 58, a threaded shaft 60, a bolt 62, a nut 64, a metallic washer 66 and a polymer washer 68. Threaded shaft 60 is coupled to cam lever 58 with bolt 62 and nut 64. Threaded shaft 60 is then inserted through washers 66 and 68. Threaded shaft 60 is further inserted through an aperture 72 provided within plate 15 and engages threaded bore 38 of mounting bracket 12. Threaded shaft 60 is rotated into threaded bore 38 to a point where armrest bracket 14 is securely coupled to mounting bracket 12. Cam assembly 56 can be actuated by rotating cam lever 58 so as to lock armrest bracket 14 in place with respect to mounting bracket 12.

Tube assembly 16 includes a first connector 80 and a second connector 82. Connector 80 is configured to receive bolt 50 and nut 52 such that armrest support tube 16 can be mounted to upper flange 40 of armrest bracket 14. Connector 80 also defines a bore 84 configured to receive a cap 86 to cover nut 52 and bolt 50. Connector 80 also defines a recessed surface 88 that engages upper flange 40 of armrest bracket 14 so as to restrict rotational movement of armrest support tube 16 with respect to armrest bracket 14. In particular, flange 40 defines a pocket 89 that engages recessed surface 88. Connector 82 of armrest support tube 16 is configured to receive a corresponding connector 90 of armrest 18. Once connector 90 is inserted within connector 82, suitable hardware can be used to secure armrest 18 to armrest support tube 16. Armrest 18 further includes an upper padded surface 92 for providing comfort to a passenger.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A motorcycle passenger armrest assembly, comprising:

a mounting bracket comprising an elongate mounting plate and a plurality of flanges attached to an edge of the mounting plate transverse to the mounting plate, the flanges configured to be coupled to an underside of a cargo carrier assembly of a motorcycle, the mounting plate having a post extending transversely from the mounting plate, and the mounting plate configured to define a bore spaced from the post;

an armrest bracket comprising an elongate plate having a notch and an opening through the plate spaced from the notch, wherein the armrest bracket is configured to be reversibly connected to the mounting bracket such that the mounting plate is in contact with and generally parallel to the elongate plate, with the notch of the armrest bracket engaging the post, and the opening of the armrest bracket aligned with the bore of the mounting bracket, and a coupling mechanism extending through the opening and into the bore to secure the armrest bracket to the mounting plate;

an armrest support tube rotatably coupled to the armrest bracket; and an armrest coupled to the armrest support tube.

2. The motorcycle passenger armrest assembly of claim 1, wherein the coupling mechanism comprises a threaded bolt, and wherein the bore is a threaded bore, the threaded bolt being threadable into the bore to secure the armrest bracket to the mounting bracket.

3. The motorcycle passenger armrest assembly of claim 2, wherein the coupling mechanism further comprises a cam coupled to the threaded bolt to thread the bolt into the bore, the cam being actuatable to secure the bolt within the bore.

* * * * *